United States Patent Office 3,076,835
Patented Feb. 5, 1963

3,076,835
AMINE SALTS OF BORON ACIDS AND ESTERS
Edward L. Kay, Akron, Ohio, and Edwin C. Knowles, Poughkeepsie, N.Y., assignors to Texaco Inc., New York, N.Y., a corporation of Delaware
No Drawing. Filed Jan. 17, 1961, Ser. No. 83,177
7 Claims. (Cl. 260—462)

This invention relates to novel amine salts of boron containing "acids." More particularly, this invention relates to primary, secondary and tertiary amine salts of tetra-covalent boron "acids."

The usefulness of many organo-boron compounds, for example, borate esters as lubricating oil additives, has been seriously hindered by their hydrolytic instability. The advantage of the boron compounds of the present invention are that they are hydrolytically stable, oxidation stable and thermally stable in both storage and use. The novel amine salts of the present invention formed by reaction of an aliphatic hydrocarbyl amine and a tetra-covalent boron "acid" are useful as load carrying additives for mineral and synthetic base lubricating oils. Our commonly-assigned, copending application Serial No. 83,174, filed of even date, relates to lubricating compositions containing selected high molecular weight amine salts of this invention.

The amine salts of tetra-covalent halogen-substituted boron "acids" of the present invention are represented by the following general formula:

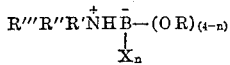

wherein R is either hydrogen or a hydrocarbyl radical containing 1 to 24 carbon atoms, R' is an aliphatic hydrocarbyl or hydroxy substituted aliphatic hydrocarbyl radical containing one or more carbon atoms and preferably at least 8 to about 30 carbon atoms, R" and R'" are hydrogen, aliphatic hydrocarbyl or hydroxy substituted hydrocarbyl radicals containing 1 to 24 carbon atoms, X is a halogen and $n$ is an integer having a value of 1 to 4 and preferably 3 or 4.

The term hydrocarbyl radical when used herein denotes a mono-valent hydrocarbon radical.

In accordance with the present invention, novel amine salts of halo-substituted tetra-covalent boron "acid" compositions may be produced by the following general process:

The compositions of the present invention are prepared by the reaction of a halo-substituted tetra-covalent boron "acid" with a primary, secondary or tertiary aliphatic amine containing one or more carbon atoms and preferably at least 8 to 30 carbon atoms. The reaction mixture is diluted with a solvent, heated to reflux temperature, at normal atmospheric pressure and solvents removed as an azeotrope. The reaction mixture is filtered, the solvent is stripped at atmospheric pressure and the amine salt of the present invention is obtained.

The aliphatic amines employed in the formation of the novel amine salts of halo-substituted tetra-covalent boron "acids" are represented by the formula:

R'''R''R'N wherein R' is an aliphatic hydrocarbyl or hydroxy substituted aliphatic hydrocarbyl radical containing one or more and preferably at least 8 to 30 carbon atoms and R" and R'" are hydrogen, aliphatic hydrocarbyl or hydroxy substituted aliphatic hydrocarbyl radicals containing 1 to 24 carbon atoms.

Examples of effective primary, secondary and tertiary amines are ethylamine, ethanolamine, triethanolamine, isopropylamine, isopropanolamine, n-propylamine, 2-ethylhexylamine, hexanolamine, n-amylamine, triamylamine, t-octylamine, laurylamine and mixtures of primary aliphatic amines such as commercially available mixtures of t-alkyl primary amines. Such mixtures include branched chain t-alkyl amines containing 11 to 14 carbon atoms and a mixture of t-alkyl primary amines wherein the alkyl group contains 18 to 22 carbon atoms.

The halogen substituted tetra-covalent boron "acids" employed in the formation of the present invention are transitory compounds and as such do not exist in the isolated state. They do, however, form stable salts. The "acids" are formed by reacting a boron tri-halide with an alcohol, phenol, halo acid or water as represented by the following general equations:

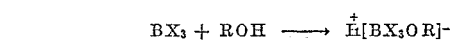
and
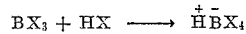

wherein R is either hydrogen or hydrocarbyl radical containing 1 to 24 carbon atoms and X is a halogen. Although these compounds are not isolatable some are available in an aqueous solution and are commercially available in that form. For example, fluoboric acid, $HBF_4$, is available in a 48% aqueous solution.

The halo-substituted tetra-covalent boron "acids" employed in the formation of the amine salts of the present invention can be represented by the formula:

wherein X in a halogen, R is a hydrogen or a hydrocarbyl radical containing 1 to 24 carbon atoms and $n$ is an integer having a value of 1 to 4 and preferably 3 to 4. Examples of effective "acids" are fluoboric acid, hydroxy fluoboric acid, dihydroxy fluoboric acid, nonylphenoxyfluoboric acid, nonylphenoxy chloroboric acid, methoxy fluoboric acid, n-propoxy fluoboric acid, benzyloxy fluoboric acid, methoxy chloroboric acid, methoxy bromoboric acid, n-propoxy chloroboric acid, n-propoxy bromoboric acid, benzyloxy chloroboric acid, and benzyloxy bromoboric acid.

Upon the formation of the transistory "acids," described above, the amine is reacted therewith to obtain the amine salts of the present invention, the reaction for which can be represented by the following general equation:

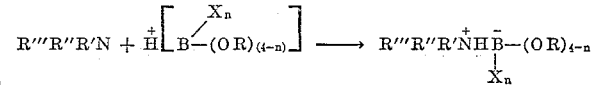

wherein R is either hydrogen or a hydrocarbyl radical containing 1 to 24 carbon atoms, R' is an aliphatic hydrocarbyl or hydroxy substituted aliphatic hydrocarbyl radical containing one or more carbon atoms and preferably at least 8 to 30 carbon atoms, R" and R'" are hydrogen, aliphatic hydrocarbyl or hydroxy substituted aliphatic hydrocarbyl radicals containing 1 to 24 carbon atoms, X is a halogen and $n$ is an integer having a value of 1 to 4 and preferably 3 or 4.

Amine salts of the present invention are illustrated by the following: t-$C_{11}$–$C_{14}$ alkyl primary amine fluoborate, t-$C_{11}$–$C_{14}$ alkyl primary amine chloroborate, t-$C_{11}$–$C_{14}$ alkyl primary amine bromoborate, t-$C_{18}$–$C_{22}$ alkyl primary amine fluoborate, t-$C_{18}$–$C_{22}$ alkyl primary amine chloroborate, t-$C_{18}$–$C_{22}$ primary amine bromoborate, t-$C_{11}$–$C_{14}$ alkyl primary amine hydroxy fluoborate, t-$C_{11}$–$C_{14}$ alkyl primary amine hydroxy chloroborate, t-$C_{11}$–$C_{14}$ alkyl primary amine hydroxy bromoborate, t-$C_{18}$–$C_{22}$ alkyl primary amine hydroxy fluoborate, t-$C_{18}$–$C_{22}$ alkyl primary amine hydroxy chloroborate, t-$C_{18}$–$C_{22}$ alkyl primary amine hydroxy bromoborate, t-$C_{11}$–$C_{14}$ alkyl primary amine nonylphenoxy fluoborate, t-$C_{11}$–$C_{14}$ alkyl primary amine nonylphenoxy chloroborate, t-$C_{11}$–$C_{14}$ alkyl primary amine methoxy fluoborate, t-$C_{11}$–$C_{14}$ alkyl primary amine n-propoxy fluoborate, t-$C_{11}$–$C_{14}$ alkyl primary amine benzyloxy fluoborate, t-$C_{11}$–$C_{14}$ alkyl primary amine methoxy chloroborate, t-$C_{11}$–$C_{14}$ alkyl primary amine methoxy bromoborate, t-$C_{11}$–$C_{14}$ alkyl primary amine n-propoxy chloroborate, t-$C_{11}$–$C_{14}$ alkyl primary amine n-propoxy bromoborate, t-$C_{11}$–$C_{14}$ alkyl primary amine benzyloxy chloroborate, t-$C_{11}$–$C_{14}$ alkyl primary amine benzyloxy bromoborate, t-$C_{18}$–$C_{22}$ alkyl primary amine nonylphenoxy fluoborate, t-$C_{18}$–$C_{22}$ alkyl primary amine nonylphenoxy chloroborate, t-$C_{18}$–$C_{22}$ alkyl primary amine methoxy fluoborate, t-$C_{18}$–$C_{22}$ alkyl primary amine n-propoxy fluoborate, t-$C_{18}$–$C_{22}$ alkyl primary amine benzyloxy fluoborate, t-$C_{18}$–$C_{22}$ alkyl primary amine methoxy chloroborate, t-$C_{18}$–$C_{22}$ alkyl primary amine methoxy bromoborate, t-$C_{11}$–$C_{14}$ alkyl primary amine n-propoxy chloroborate, t-$C_{18}$–$C_{22}$ alkyl primary amine n-propoxy bromoborate, t-$C_{18}$–$C_{22}$ alkyl primary amine benzyloxy chloroborate, t-$C_{18}$–$C_{22}$ alkyl primary amine benzyloxy bromoborate, triamyl amine fluoborate, triamyl amine chloroborate, triamyl amine bromoborate, N,N-dimethyl hexadecyl amine fluoborate and N,N-di-methyl hexadecyl amine chloroborate.

The preparation of the specific novel acid amine salts of tetra-covalent boron "acids" of the present invention is illustrated in the following examples.

EXAMPLE I

*Preparation of Amine Salt of Trifluoro-Nonylphenoxy Boron "Acid"*

284 grams of boron trifluoride etherate, equivalent to 2.0 mols of boron trifluoride, was added to 500 mls. pentane containing 440 grams, 2.0 mols of nonylphenol, cooled to 6–10° C., to form the trifluoro-nonylphenoxy boron "acid." 390 grams, 2 mols of a mixture of t-alkyl primary amines wherein the t-alkyl groups contain 11–14 carbon atoms were added. The pot temperature rose and an ice water bath was used to moderate the reaction. Pentane and ether were removed by stripping on a steam bath at a temperature of 100° C. and the t-$C_{11}$–$C_{14}$ alkyl amine trifluoro-nonylphenoxy borate having the formula:

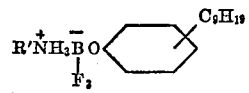

wherein R′ is a tertiary hydrocarbyl group containing 11–14 carbon atoms, was isolated.

EXAMPLE II

*Preparation of Amine Salt of Trichloro-Nonylphenoxy Boron "Acid"*

59 grams, 0.5 mol, of boron trichloride was reacted with 110 grams, 0.5 mol of nonylphenol in the same manner as in Example I to form the trichloro-nonylprenoxy boron "acid." 630 grams, 2.0 mols (excess), of a mixture of t-alkyl primary amines wherein the t-alkyl groups contain 18–22 carbon atoms mixture were added and the pot temperature rose from 25° C. to 40° C. Solvent and volatiles were removed by distillation and the t-$C_{18}$–$C_{22}$ alkyl amine trichloro-nonylphenoxy borate having the formula:

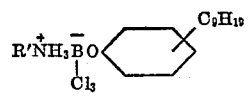

wherein R′ is a tertiary hydrocarbyl group containing 18–22 carbon atoms, was isolated with excess amine.

EXAMPLE III

*Preparation of Amine Salt of Fluoboric "Acid"*

1281 grams of a 48% aqueous fluoboric acid solution equivalent to 7.0 mols of $HBF_4$ was added directly to 2205 grams. 7.0 mols of t-alkyl primary amines wherein t-alkyl groups contain 18 to 22 carbon atoms. After addition 250 mols toluene was added and the mixture heated to reflux. A total of 630 mls. of water was removed by azeotropic distillation. The toluene was stripped at a pot temperature of 165° C. The product was cut back with pentane, treated with bone charcoal, and filtered through Filter-Cel. Pentane was removed on a steam plate and the t-$C_{18}$–$C_{22}$ alkyl amine fluoborate having the formula:

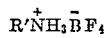

wherein R′ is a tertiary hydrocarbyl group containing 18 to 22 carbon atoms, was isolated.

EXAMPLE IV

*Preparation of Amine Salt of Fluoboric "Acid"*

Reaction here was the same as that shown in Example III with the exception that $C_{11}$–$C_{14}$ t-alkyl primary amine was used instead of a $C_{18}$–$C_{22}$ tertiary alkyl amine and the t-alkyl $C_{11}$–$C_{14}$ amine fluoborate having the formula:

wherein R′ is a tertiary hydrocarbyl group containing 11–14 carbon atoms, was isolated.

EXAMPLE V

*Preparation of Amine Salt of Hydroxy Fluoboric "Acid"*

An excess of boron trifluoride was passed into a stirred mixture of 36 grams, 2.0 mols of water and 500 mls. of pentane until saturated. 390 grams, 2.0 mols of t-$C_{11}$–$C_{14}$ alkyl primary amine was then added and again additional boron trifluoride was passed into the reaction mixture until saturated. Pentane was stripped to a pot temperature of 70° C. with only a trace of water being present in the distillate. 517 grams of clear yellow viscous liquid t-$C_{11}$–$C_{14}$ alkyl primary amine hydroxy fluoborate having the formula:

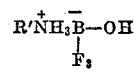

wherein R′ is a tertiary hydrocarbyl group containing 11 to 14 carbon atoms, was isolated.

EXAMPLE VI

*Preparation of Amine Salt of Hydroxy Fluoboric "Acid"*

Boron trifluoride was passed into stirred mixture of 90 grams (5.0 mols) water and 500 mls. of pentane until saturated. 1575 grams, 5.0 mols of t-$C_{18}$–$C_{22}$ alkyl primary amine was then added and additional boron trifluoride passed into the mixture until saturated. Pentane was stripped at a pot temperature of 90° C., and water was also removed. The resulting liquid was filtrated and the t-$C_{18}$–$C_{22}$ alkyl primary amine hydroxy fluoborate having the formula:

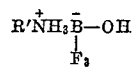

wherein R′ is a tertiary hydrocarbyl group containing 18 to 22 carbon atoms, was isolated.

EXAMPLE VII

*Preparation of Amine Salt of Fluoboric "Acid"*

183 grams of 48% aqueous fluoboric acid, 1.0 mol equivalent of $HBF_4$ was added directly to 227 grams, 1.0 mol of triamyl amine and the mixture was cut back with 300 mls. of benzene. 80 mls. of water were drawn off and an additional 13 mls. of water was subsequently removed by azeotropic distillation. Solvents were stripped to a pot temperature of 150° C., and the triamyl amine fluoborate having the formula:

$$(C_5H_{11})_3\overset{+}{N}H\overset{-}{B}F_4$$

was isolated.

EXAMPLE VIII

*Preparation of Amine Salt of Fluoboric "Acid"*

183 grams of 48% aqueous fluoboric acid, 1.0 mol equivalent of $HBF_4$ was added directly to 149 grams, 1.0 mol of triethanol amine. The pot temperature rose rapidly and the exothermic reaction was moderated by cooling with an ice-water bath. The triethanol amine fluoborate having the formula:

$$(C_2H_4OH)_3\overset{+}{N}H\overset{-}{B}F_4$$

was water soluble and was isolated as an aqueous solution.

EXAMPLE IX

*Preparation of Amine Salt of Fluoboric "Acid"*

183 grams of 48% aqueous fluoboric acid, 1.0 mol equivalent of $HBF_4$ was added directly to 269 grams, 1.0 mol of N,N-di-methyl hexadecyl amine. The product was a white solid and sufficient pentane was periodically added during the addition in order to decrease the viscosity of the reaction mixture. The reaction mixture was filtrated and N,N-di-methyl hexadecyl amine fluoborate having the formula:

$$C_{16}H_{33}-\overset{+}{\underset{\underset{CH_3}{|}}{N}}\overset{CH_3}{\overset{/}{\underset{}{H}}}\overset{-}{B}F_4$$

was collected on the filter.

As is known in the art, many organo borate compounds do not always perform as satisfactory additives for lubricants, fuels and the like because of their hydrolytic instability and it is to this end that the salts of the present invention demonstrate at least one of their advantages. The amine salts of the tetra-covalent boron "acids" of the present invention are hydrolytically stable in both water and lubricating oils.

As is clear from the foregoing disclosure and examples, considerable latitude may be exercised in the choice of primary, secondary or tertiary amines and in the selection of the halogen-substituents of the tetra-covalent boron acid.

We claim:

1. Amine salts of tetra-covalent boron acids having the following formula:

$$R'''R''R'\overset{+}{N}H\overset{-}{B}-(OR)_{4-n}$$
$$|$$
$$X_n$$

wherein R is selected from the group consisting of hydrogen and a hydrocarbyl radical containing 1 to 24 carbon atoms, R' is selected from the group consisting of an aliphatic hydrocarbyl radical and a hydroxy substituted hydrocarbyl radical both containing one to 30 carbon atoms, R'' and R''' are selected from the group consisting of hydrogen, an aliphatic hydrocarbyl radical and a hydroxy substituted aliphatic hydrocarbyl radical both containing 1 to 24 carbon atoms, X is a halogen and $n$ is an integer having a value of 1 to 3.

2. Amine salts described in claim 1 wherein R' is an aliphatic hydrocarbyl radical containing 11 to 14 carbon atoms.

3. An amine salt described in claim 1 wherein R' is an aliphatic hydrocarbyl radical containing 18 to 22 carbon atoms.

4. An amine salt having the formula:

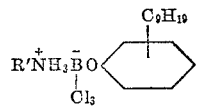

wherein R' is a tertiary hydrocarbyl group containing 11–14 carbon atoms.

5. An amine salt having the formula:

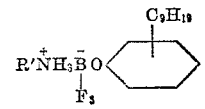

wherein R' is a tertiary hydrocarbyl group containing 18 to 22 carbon atoms.

6. An amine salt having the formula:

$$R'\overset{+}{N}H_3\overset{-}{B}-(OH)$$
$$|$$
$$F_2$$

wherein R' is a tertiary hydrocarbyl group containing 11 to 14 carbon atoms.

7. An amine salt having the formula:

$$R'\overset{+}{N}H_3\overset{-}{B}-(OH)$$
$$|$$
$$F_2$$

wherein R' is a tertiary hydrocarbyl group containing 18 to 22 carbon atoms.

References Cited in the file of this patent

FOREIGN PATENTS 645,202     Great Britain _____ Oct. 25, 1960